Sept. 12, 1933.    F. C. WALZ    1,926,568
DIRECT CURRENT AMPLIFIER AND METHOD OF OPERATING SAME Filed Feb. 21, 1930

INVENTOR
Frank C. Walz
BY Ritter, Mechlin & O'Neill
ATTORNEYS

Patented Sept. 12, 1933

1,926,568

UNITED STATES PATENT OFFICE 1,926,568

DIRECT CURRENT AMPLIFIER AND METHOD OF OPERATING SAME

Frank C. Walz, Boulder, Colo., assignor of one-half to Stanolind Oil and Gas Company, Tulsa, Okla., a corporation of Delaware Application February 21, 1930. Serial No. 430,317

5 Claims. (Cl. 179—171)

The invention relates to direct current amplifiers, which include an electron discharge device or audion, with a resistance in the grid circuit bridging the input terminals or leads, and has for its object to compensate the potential drop across said resistance, so that the points of connection of the external circuit on opposite sides of the resistance are at the same potential, whereby the readings of a voltmeter, galvanometer or similar indicator, included in the output circuit, will be directly proportional to the voltages of any external circuit with which the amplifier is connected and are independent of the resistance of such external circuit.

Various modes of applying the invention are illustrated in the accompanying drawing, in which:—

The most practical and widely used circuit arrangement for the input of a direct current amplifying system includes the input terminals or leads, adapted to be connected to the external circuit and a resistance included in the grid circuit of the audion or electron device, which resistance bridges the input terminals or leads, the said resistance also being in parallel with the resistance in the circuit from the grid to the filament. One of the most important uses of a direct current amplifier is the measuring of voltages to be indicated by a meter included in the output circuit, and a necessary characteristic of such a meter is that it involves a high resistance, in fact, the magnitude of the resistance per volt measured by the meter is more or less an index of its worth and efficiency. In an apparatus of the kind referred to, in order to obtain high input resistance and also high amplification, it is necessary to have the resistance in the grid circuit of nearly the same magnitude as the resistance in the circuit from the grid to the filament of the first tube or audion.

Since it is impossible to design tubes which have zero grid current, it is obvious that there will be a potential drop across the resistance in the grid circuit. The measure of this drop in the potential or voltage will be indicated approximately by $V = RI_g$, in which V represents the potential drop and $I_g$ the grid current. If the input terminals were now connected to a finite or zero resistance, there would be a large change in the potential of the grid and, consequently, a large change in the plate current. For the case in which the input circuit is shorted, the change in the grid voltage would be approximately $RI_g$. Inasmuch as such a change in voltage would be from 1000 to 10000 times the range of potential which an amplifier would be designed to measure, it is obvious that disastrous effects on the galvanometer or voltmeter employed in the output circuit and also on the output audion or tube (if more than one stage of amplification were used), would ensue. It is, therefore, apparent that the ordinary input of a direct current amplifier is unsuited for open circuit work and, also, that the zero setting of the amplifier is dependent upon the resistance of the external circuit to which the amplifier is connected, unless that resistance is much larger than the resistance included in the grid circuit.

The present invention is designed to adapt the direct current amplifier of the type indicated to the measurements of voltages in an external circuit wholly independent of the resistance in said circuits and depends primarily upon the principle of establishing points of equal potential between the input terminals or leads on opposite sides of the resistance in the grid circuit.

Figure 1:
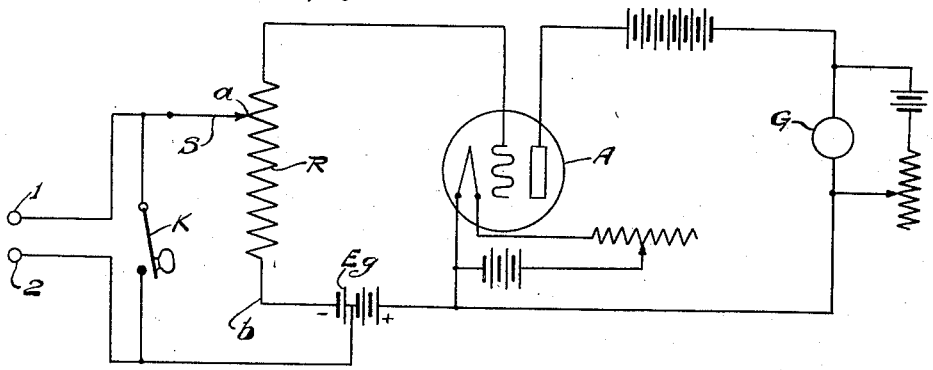
Fig. 1 is a diagram for a direct current amplifying system for use with a voltmeter, embodying the preferred form of the invention.

A relatively simple method of obtaining this result is exemplified in Fig. 1, in which 1 and 2 indicate the input terminals, adapted to be connected to an external circuit, the voltage in which is to be determined and indicated in the amplifier by a voltmeter, galvanometer or the like included in the output circuit of the amplifier. A indicates a typical audion or tube, Eg the battery included in the grid circuit, which latter includes a resistance R, which bridges the input terminals or leads and which, therefore, imposes a difference of potential on the input terminals, which must be compensated for or balanced out, if the apparatus is to be effective for accurately measuring voltages in the external circuit, when the latter is connected to the input terminals. As indicated in the diagram, the drop in potential across the resistance R is compensated by including one of the cells of the grid battery Eg across the input terminals or leads, so that the voltage of said cell will compensate for the drop in voltage across the resistance R and this compensating voltage is accurately regulated by means of the slide S connecting the input terminal 1 with the resistance R, said sliding contact being adjustable with respect to the resistance R. It will, therefore, be seen that the potential difference of one cell of the battery Eg is now included between the input terminals. This makes it possible to adjust the potential drop across R equal to the potential rise of the cell, so that the rise in potential cancels the drop in potential, and, therefore, obtains or establishes zero potential difference between the input terminals. Before connecting the external circuit, the zero potential difference therebetween can readily be determined and established by closing the tap key K bridged between the input terminals and adjusting the slide S until no deflection of the galvanometer G occurs. With the zero potential difference between the input terminals established, it will be apparent that the difficulties hereinbefore referred to as inherent in this general type of amplifier are avoided and the amplifier readings indicated on the meter G will be strictly proportional to the voltages in the external circuit connected to the input terminals and are wholly independent of the resistance of such circuit. Inasmuch as the grid currents are extremely small, with the usual negative grid bias, the resultant drain on the grid battery is also small, wherefore the current is very steady and one adjustment of the apparatus should suffice for many hours of use.

Figure 2:
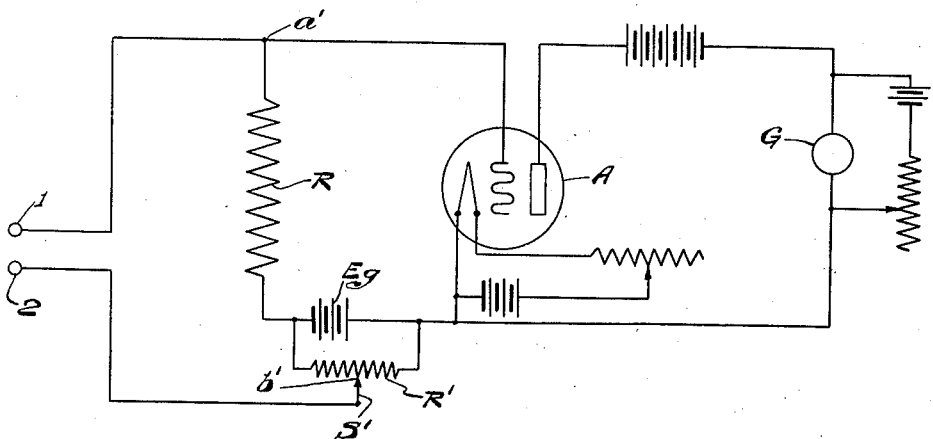
Figs. 2 and 3 are similar views showing modified means for compensating the voltage drop in the resistance element of the grid circuit.

In the modified form of the apparatus illustrated in Fig. 2, practically the only difference is that the countervailing voltage from the grid battery to the input terminals is obtained by means of a shunt about the grid battery Eg, in which is included a resistance R' and a sliding contact S' associated therewith, so that the voltage between points a' and b' may be accurately adjusted to exactly compensate for the drop of voltage due to the resistance R.

Figure 3:
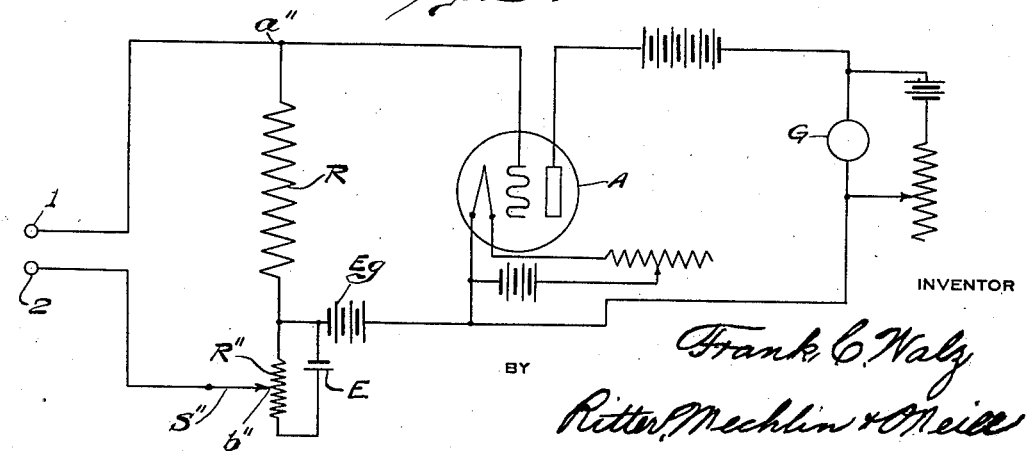

Fig. 3 shows a further modification in which a separate cell or battery E, together with an adjustable resistance R'' and an adjustable slide S'' cooperating with said resistance, is included between the input terminals or leads in the manner and form shown, the slide S'' being adjusted until points a'' and b'' are at the same potential.

In each form of the apparatus, the compensating voltage imposed on the input terminals or leads is so regulated as to equal the drop of potential across the resistance R in the grid circuit, or, as indicated in Fig. 1, to establish equal potentials at points a and b in the input circuit, on opposite sides of the resistance and, similarly, a' and b' in Fig. 2, and a'' and b'' in Fig. 3. The balancing of the potential difference is with respect to the external circuit only, and not the grid circuit, as the normal value of the grid potential remains unaltered. The general principle involved in the practice of the invention is to connect the input leads to any two points on opposite sides of the resistance in the grid circuit in such manner that the points are at the same potential; that is to say, there is no normal difference of potential existing between the points before the external connections are made and this is effected by imposing an electromotive force or potential drop on the input leads on opposite sides of the resistance of the grid circuit to compensate for the drop in potential across the resistance.

What I claim is:

1. The method of compensating the potential drop caused by the flow of grid current through an input coupling resistance in the grid circuit of a direct current amplifier, which comprises imposing a potential difference upon the input circuit of the amplifier in opposition to the potential drop across the resistance, and regulating said imposed potential differences to compensate the total potential drop, whereby the voltage of the output circuit with which the amplifier is associated will not be affected by the flow of grid current in the amplifier.

2. The method as described in claim 1, in which the potential difference is derived from a portion of the grid circuit current source.

3. In a voltage measuring system, comprising an initial audion amplifier with an input coupling resistance in the grid circuit, the method of compensating the voltage drop through said resistance, which comprises imposing a potential difference, derived from a portion of the grid circuit current source, upon the input circuit in opposition to the potential difference in said grid circuit sufficient to produce points of equal potential in the opposite sides of the input circuit, whereby the voltage of the output circuit with which the amplifier is associated will be directly proportional to the voltage of the input circuit.

4. An audion amplifying circuit, including an initial audion amplifier and a resistance in bridging relation with the input circuit, means for compensating the total voltage drop across said resistance, comprising a source of potential connected to the input circuit in opposition to the normal potential across said resistance; and means for regulating the said source of potential, whereby the voltage of the output circuit with which the amplifier is associated will be directly proportional to the voltage of the input circuit.

5. An audion amplifying circuit including an initial audion amplifier and a resistance in bridging relation with the input circuit, means for compensating the total voltage drop across said resistance including a portion of the grid circuit potential source connected to the input circuit in opposition to the normal potential in the grid circuit, and means for regulating the opposition potential, whereby the voltage of the output circuit with which the amplifier is associated will be directly proportional to the voltage of the input circuit.

FRANK C. WALZ.